United States Patent [19]

McVay et al.

[11] 4,400,356
[45] Aug. 23, 1983

[54] COMBUSTION CATALYST BED

[75] Inventors: Donald R. McVay, Simsbury; Herbert J. Setzer, Ellington, both of Conn.

[73] Assignee: United Technologies Corporation, Hartford, Conn.

[21] Appl. No.: 344,897

[22] Filed: Feb. 1, 1982

[51] Int. Cl.³ .............................................. B01D 53/36
[52] U.S. Cl. ..................................... 422/171; 110/203; 110/345; 126/58; 126/299 F; 422/177; 422/180; 431/7
[58] Field of Search .............. 422/171, 177, 180; 60/299; 110/203, 210, 345; 126/58, 77, 217, 285 R, 299 F; 431/5, 7, 328; 423/210, 213.2

[56] References Cited

U.S. PATENT DOCUMENTS

| | | | |
|---|---|---|---|
| 2,658,742 | 11/1953 | Suter | 422/180 X |
| 2,720,494 | 10/1955 | Suter | 252/470 |
| 3,245,459 | 4/1966 | Keith | 431/329 |
| 3,476,524 | 11/1969 | Burke | 422/180 X |
| 3,754,870 | 8/1973 | Carnahan et al. | 422/171 |
| 3,785,778 | 1/1974 | Burstein et al. | 423/213 X |
| 3,806,322 | 4/1974 | Tabak | 422/180 X |
| 3,898,040 | 8/1975 | Tabak | |
| 3,964,875 | 6/1976 | Chang et al. | |
| 4,018,568 | 4/1977 | Brewer | |
| 4,021,203 | 5/1977 | Givens et al. | 422/171 |
| 4,054,418 | 10/1977 | Miller et al. | 422/171 |
| 4,072,007 | 2/1978 | Sanday | 422/171 X |
| 4,080,150 | 3/1978 | Hunter et al. | 431/6 |
| 4,127,691 | 11/1978 | Frost | 428/116 |
| 4,135,018 | 1/1979 | Bonin et al. | 428/116 |
| 4,221,207 | 9/1980 | Syme | 126/77 |
| 4,246,234 | 1/1981 | Kittrell et al. | 422/180 X |
| 4,270,896 | 6/1981 | Polinski et al. | 431/328 |
| 4,290,785 | 9/1981 | Alldredge | 422/171 X |
| 4,330,503 | 5/1982 | Allaire et al. | 126/285 R X |
| 4,348,362 | 9/1982 | Foss | 422/171 |

Primary Examiner—Richard L. Chiesa
Attorney, Agent, or Firm—Harry J. Gwinnell

[57] ABSTRACT

A catalytic combustor bed configuration particularly adapted for use in wood and coal burning stoves is described comprising a support screen having a layer of fully catalyst impregnated particulate material next to the screen, a layer of particulate material catalyzed on its outer surface next to the layer of fully impregnated material and a layer of uncatalyzed particulate material next to the outer surface catalyzed material. Optionally, a layer of uncatalyzed particulate material may be used between the screen and the fully impregnated particulate material. Such an arrangement, in addition to making maximum utilization of the catalyst material, also minimizes pressure drop across the catalytic combustor.

8 Claims, 4 Drawing Figures

GAS FLOW

FIG. 1
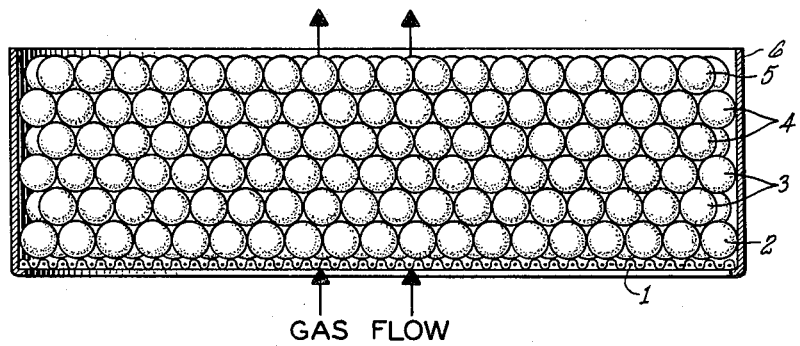
GAS FLOW
FIG. 2
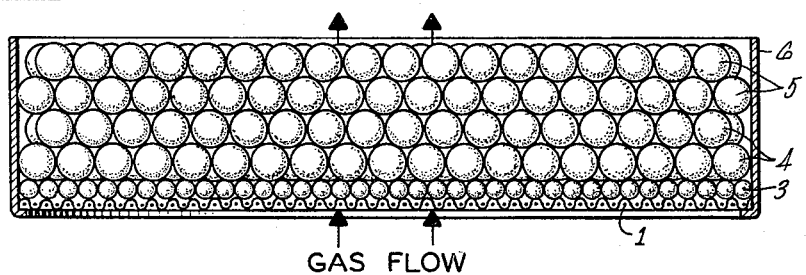
GAS FLOW
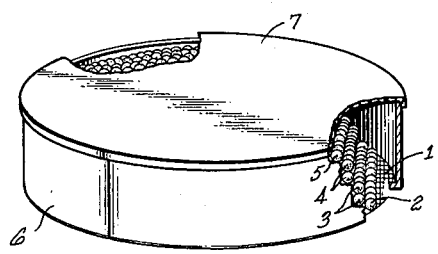
FIG. 4

COMBUSTION CATALYST BED

DESCRIPTION

1. Technical Field

The field of art to which this invention pertains is combustion catalysts, and particularly bed configurations for such catalysts.

2. Background Art

In view of the ever increasing concern over the availability and cost of energy resources such as oil and natural gas, many people have turned to solid fuels such as wood and coal for heating their dwellings. Much of this solid fuel combustion technology as represented by wood and coal burning stoves is 40–50 years old or older. However, recently newer stove designs aimed at cleaner burning and improvement of the efficiency have been developed. Note, for example, U.S. Pat. No. 4,221,207.

The latest so-called "second generation" stoves have sought additional and substantial improvements in burning efficiency and reduced emissions of pollutants by including in the design such things as the insertion of a catalytic combustor in the exhaust portion of the stoves to cause additional combustion of the exhaust or smoke exiting from the stove. This "afterburning" or secondary burning of combustibles in the exhaust decreases pollutants leaving the stove and reduces such things as creosote build-up in chimneys. Such combustors also improve the combustion efficiency of the stove and thus provide greater heat per amount of fuel combusted. However, because of the precious nature and costs of the catalyst material used in such combustors, there is a constant search for maximizing the efficiency of such combustors per amount of catalyst utilized.

Accordingly, even though advances have been made in this area to date, there is still a need for improving the performance and efficiency of such combustion systems.

DISCLOSURE OF INVENTION

The present invention is directed to a combustion catalyst bed configuration, especially adapted for use in wood and coal burning stoves which maximizes catalyst efficiency per amount of catalyst utilized and additionally minimizes pressure drop across the catalyst bed for improved performance in natural draft solid fuel combustion devices such as wood and coal burning stoves. The combustion catalyst according to the present invention responsible for such results includes a support screen having an inlet layer of combustion catalyst support particles substantially fully impregnated with a metallic combustion catalyst. Next to this section of fully impregnated particles is a layer of catalyst support particles surface catalyzed with combustion catalyst material. The exit layer or section of the bed comprises catalyst support particles unimpregnated with catalyst material.

Another aspect of the invention includes a combustion catalyst bed as above described including a support screen having a section or layer of relatively large particles which are uncatalyzed and inert to the combustion gases next to the screen. The remaining layers next to the layer of uncatalyzed pellets are fully impregnated, surface catalyzed, and uncatalyzed particles as described above.

Another aspect of the invention includes a solid fuel burning stove containing such catalytic combustor material.

The foregoing, and other features and advantages of the present invention, will become more apparent from the following description and accompanying drawings.

BRIEF DESCRIPTION OF THE DRAWINGS

FIGS. 1 and 2 show typical catalytic combustor configurations according to the present invention.

FIG. 4 is a perspective view, partly in section and partly broken away, of a typical catalytic combustor according to the present invention.

BEST MODE FOR CARRYING OUT THE INVENTION

Figure 3:
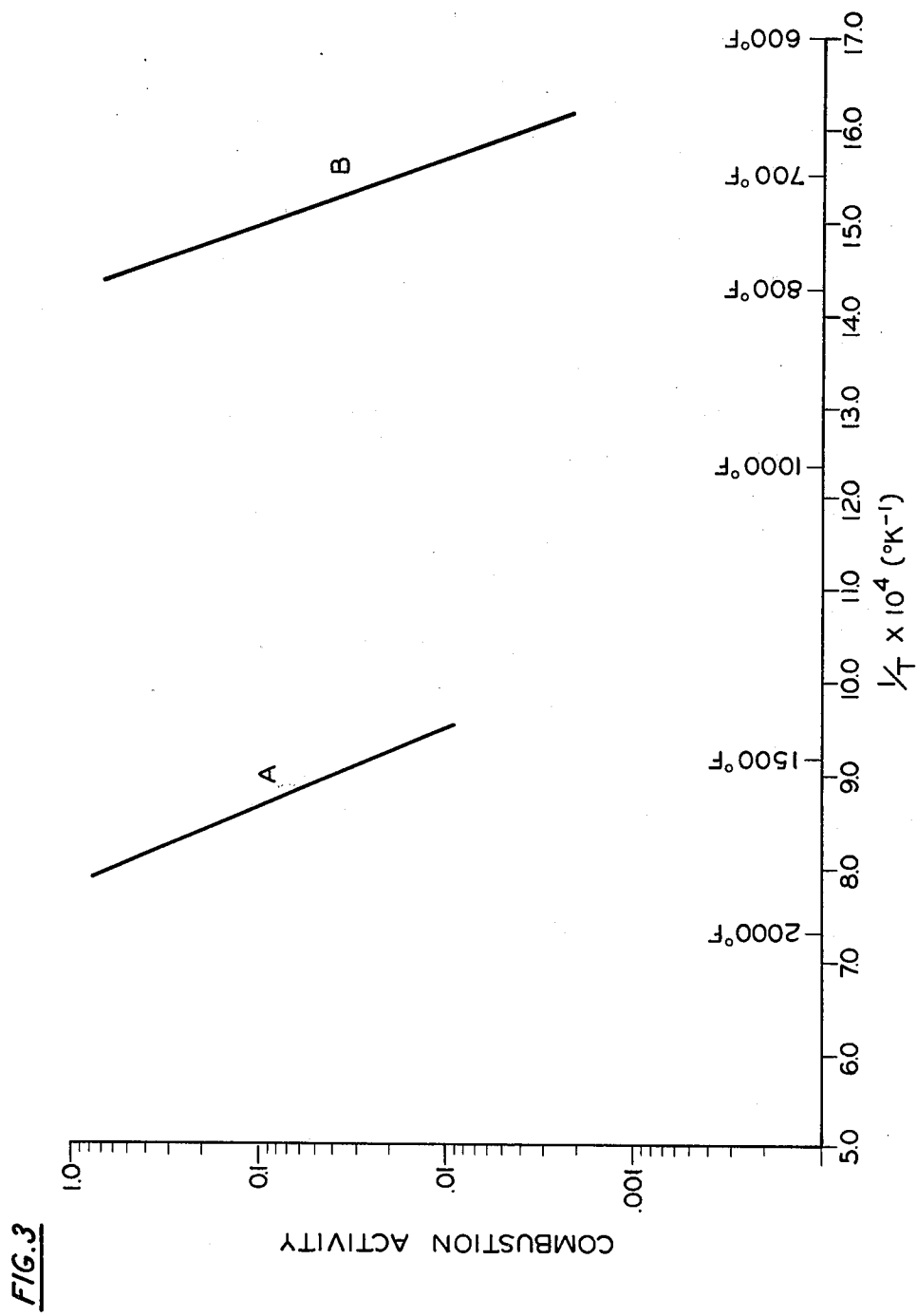
FIG. 3 is a comparison of combustion activity of a commercially available catalyst and a catalyst according to the present invention.

An inspection of the Figures demonstrates typical catalyst bed configurations according to the present invention. In FIG. 1, support screen 1 can comprise stainless steel or any other material which is stable in an exhaust gas channel such as an internal exhaust gas manifold or an external flue pipe or chimney. While it can be any size required by the particular stove design in which it will be used, it is typically 0.5 to 2 feet$^2$ (15.24 to 60.96 cm)$^2$ with openings sufficiently large so as not to interfere with the natural draft of the exhaust gas channel, but sufficiently small to support the layers of pellets above. Stainless steel screens with substantially square openings of approximately 0.0625 inch (0.159 cm) diagonal measure are typically used. The depth of particles loaded onto the screen generally range from 0.375 inch to 2 inches (0.935 cm to 5.08 cm) depending on the exhaust channel in which they will be used. In a natural draft environment, a lower pressure drop is required and catalyst bed depth must be kept thin. In a forced draft environment in which a greater pressure drop can be tolerated, the depth of the catalyst layers can be greater.

In FIG. 1, the first layer of particles 2 next to the screen is shown as uncatalyzed pellets which act as a radiation shield in the exhaust environment. This material can be any material inert to the exhaust gas environment and has been made of the same material as the catalyzed paraticles, that is a lanthanum stabilized alumina or magnesium promoted lanthanum stabilized alumina. These particles can be of any shape desired such as cylindrical, spherical, irregular, or any shape to allow free passage of gas and capable of supporting the catalyst material. Spherical pellets are preferred because they tend to promote a uniform gas flow pattern across the bed. While any size particles can be used as the first layer, they are typically 0.0625 to 0.625 inch (0.159 to 1.59 cm) in diameter and preferably 0.125 in. to 0.25 in. (0.318 cm to 0.635 cm) in diameter, and if other than spherical particles are used, they should be of similar dimensions.

The subsequent layers or sections in the combustor of FIG. 1 are similar to the layers making up the combustor shown in FIG. 2. This first layer of pellets 3 next to the screen in FIG. 2 and one layer removed from the screen in FIG. 1, comprises a substrate material similar to that uncatalyzed in FIG. 1 fully impregnated with the combustion catalyst material. In FIG. 1, the particles are shown as substantially the same size as those in the first layer, and in FIG. 2, the particles are shown relatively smaller. In both instances, the particles are the same 0.125 in. to 0.625 in. (0.318 cm to 1.59 cm) in diameter, preferably 0.25 inch (0.635 cm) in the embodiment shown in FIG. 1 and 0.125 inch (0.318 cm) in the embodiment shown in FIG. 2. Next to this layer of fully catalyzed particles 3 is a layer of catalyst particles 4 which are "ring catalyzed." By ring catalyzed is meant that unlike the fully impregnated pellets of the former layer, only the outer portion of the pellet nearest the surface is impregnated with catalytic material. Typically, twenty five percent or less (i.e. penetration of 0.001 in. to 0.100 in., 0.0025 cm to 0.254 cm) of the outermost portion of the pellet is catalyzed. The innermost portion of the pellet remains uncatalyzed.

The exit layer of pellets 5 comprise pellets similar to the fully impregnated catalyst pellets only being uncatalyzed. This exit layer is added as a radiation shield to prevent heat loss from the catalyst bed which should be kept hot for best combustion efficiency. The term layer is meant to include not only a single layer of particles, i.e. a layer one particle diameter thick but also a plurality of particulate layers, i.e. a layer several particle diameters thick. The layer thickness is determined by the function of the particular layer and in general would be about one to about five particle diameters thick.

While the relative proportions of the respective layers is dictated by such things as the particular combustion products passing therethrough and their rate of flow, coupled with the specific temperature they will experience, typically, in the embodiment shown in FIG. 1 the relative amounts of the uncatalyzed, fully catalyzed, and ring catalyzed layers will be the same with about half as much uncatalyzed pellets being used as the uppermost layer and in the embodiment in FIG. 2, all layers being relatively the same thickness with the fully catalyst impregnated layer next to the screen being about half the thickness of the other layer. The exact amount of catalyst required will be determined by the burning rates of the wood and coal in the stove. The combustion rate of the fuels determines the quantity of exhaust or flue gases generated which in turn sets the quantity of combustion catalyst required. Furthermore, in a wood or coal burning stove environment, the inlet temperature seen generally ranges from 400° F. to 900° F. (204° C. to 482° C.) and the exit temperature ranges from 1100° F. to 1600° F. (593° C. to 871° C.).

The function of the metal screen is obvious, i.e. as a support material for the various particle layers. The function of the first layer in the embodiment shown by FIG. 1, the uncatalyzed particles, is as a radiation/heat shield which functions to prevent the first layer of catalyzed pellets from cooling by radiation to incoming gases or to the cooler exhaust channel walls. The second layer in the embodiment shown by FIG. 1 and the first layer next to the screen in the embodiment shown by FIG. 2, the fully catalyst impregnated pellets function to reduce the ignition temperatures of the hydrocarbon and carbon monoxide material in the exhaust gas stream to burn in the range of 400° F. to 600° F. (204° C. to 316° C.). At this temperature, it has been calculated that the combustion rate of the gases is kinetically relatively slow and it is this rate which limits the total burning of the exhaust gases. This is referred to as kinetically limited burning. In this condition, fully impregnated pellets are preferred because the combustion rate is slow enough to permit diffusion of gases and air to the innermost sections of the pellets where combustion occurs. In other words, in the kinetically limited mode the catalyst in the entire pellet is fully utilized to promote combustion. The heat generated from this burning further raises the temperature of the catalyst and support material, which in turn, further increases its catalytic activity. Furthermore, the high temperatures produced crack the heavy materials in the smoke or exhaust stream and leads to further combustion. As the carbon-monoxide and heavy hydrocarbon material in the exhaust gas stream continue to burn as a result of contact with the first layer of fully catalyzed pellets, the temperature will rise to in the order of 1200° F. to 1400° F. (649° C. to 760° C.). At this temperature, the reaction rate is very fast, and the combustion rate is limited by diffusion of the reactants to the surface of the pellets and diffusion within the outer layers of the pellets. The use of ring catalyzed pellets in this zone is an efficient way to avoid loading the pellets with useless catalyst material in the inner portion of the pellet where it would not be utilized. And finally, the outermost uncatalyzed particulate material functions in a manner similar to the first layer next to the screen in the embodiment shown by FIG. 1, i.e. to prevent heat loss from the combustion catalyst particles to the cooler walls of the exhaust channel.

The merits of using a layer of fully impregnated particle followed by ring catalyzed particle can be further demonstrated by observation of the Table where the effectiveness factors ($N_{eff}$) are demonstrated for different diameter (D) pellets at different temperatures. From the Table, it can be seen that the entire pellet is being utilized at 500° F. (260° C.) test temperature (effectiveness factor of 1.0). The rate limiting step is primarily a function of the reaction itself. At 1000° F. (538° C.), however, the effectiveness factor falls significantly. The calculations show that at 1000° F. (538° C.), the outer 19% of 0.125 in. (0.318 cm) pellets and the outer 4% of 0.25 in. (0.635 cm) pellets are effective in catalyzing the combustion reaction. The rate of the combustion reaction is governed substantially by diffusion of the combustible gases into and out of the pores in the porous pellet material. And at 1600° F. (871° C.), there is a further significant drop-off in the effectiveness factor. At this temperature, the burning rate is limited by bulk diffusion of remaining unburned material and air to the surface of the catalyst pellets.

TABLE

| Temp °F. (°C.) | D = 0.125 in. (0.318 cm) | D = 0.25 in. (0.635 cm) | Rate Limiting Step |
|---|---|---|---|
| 500 (260) | 1.0 | 1.0 | Kinetically controlled |
| 1000 (538) | .19 (19%) | .04 (4%) | Pore Diffusion Controlled |
| 1600 (871) | 0.01 | 0.01 | Bulk Diffusion Controlled |

As the substrate material, either a lanthanum stabilized alumina or a magnesium promoted lanthanum stabilized alumina can be used. The lanthanum stabilized alumina substrate is a commercially available catalyst support material available from W. R. Grace & Co. (e.g. Grace SMR 1449). The magnesium promoted lanthanum stabilized alumina is prepared by impregnating the lanthanum stabilized alumina with a solution (preferably aqueous) of a magnesium salt (preferably magnesium nitrate) followed by drying to remove the solvent, and calcining in air to oxidize the deposited salt to magnesium oxide. Calcining temperatures may vary depending on the particular salt used, but generally temperatures in the range of about 1800° F. (982° C.) are used, e.g. for magnesium nitrate. Enough magnesium salt is deposited on the support material such that after calcining, about 3% to about 15% magnesium is present in the support material, and preferably about 5% by weight. Attention is directed to copending, commonly assigned U.S. patent application Ser. No. 344,896, filed on even date herewith entitled "Catalytic Combustor" by R. Vine, J. C. Trocciola and H. Setzer, the disclosure of which is incorporated by reference.

The use of such substrate material is important becauase of its particular stability at elevated temperatures in such a gas combusting environment. Such substrate material has been found to maintain a high B.E.T. (Bruinauer-Emmet-Teller) surface area, the substrate material maintains its dimensional stability (e.g. lack of shrinkage, especially in the preferred pellet form), and has an acceptable crush strength (e.g. when packed into canisters) especially when magnesium promoted. This substrate material has also been found to allow formation of small metal crystallites on its surface which is necessary for catalytic performance according to the present invention. The material also has improved tolerance to carbon formation over, for example, unmodified alumina.

The active catalyst material according to the present invention is deposited on the substrate material by any conventional method in this art, and preferably out of aqueous solution. Metal salts and typically the nitrates are dissolved in either aqueous or organic solvents and dried on the substrate. The deposited salts are then treated with hydrogen to form metal crystallites. Rhodium has been found to be a particularly suitable catalyst because of its sulfur tolerance in this environment. Note the above cited commonly assigned application. It should be noted that any acceptable route may be used to go from the salt to the metal such as going from the salt form directly to the metal crystallites by hydrogen reduction or oxidation of the salt in air followed by reduction in hydrogen so long as the metal crystallites are formed on the substrate material ultimately. Amounts of rhodium used may vary over a wide range, but are generally used in amounts based on catalyst plus support material of about 0.01% to about 6% rhodium, and typically in amounts of about 0.1% to about 1% rhodium.

EXAMPLE

A lanthanum stabilized alumina catalyst support material was purchased from W. R. Grace & Co. in pellet form having dimensions of about 0.25 in. (0.636 cm) diameter and about 0.250 in. (0.638 cm) length. A batch of these pellets were immersed in an aqueous solution of Mg $(NO_3)_3 \cdot 6H_2O$ having a concentration of about 57% by weight. After immersion for approximately 5 minutes with ultrasonic vibration and 30 minutes without, the pellets were removed from the solution. The pellets were then over dried in air for 3 hours at about 110° C. and calcined at 1800° F. (982° C.) for 16 hours and cooled. The magnesium promoted lanthanum stabilized alumina pellets were then immersed in an aqueous solution of Rh $(NO_3)_3$ having a concentration of about 11.1% by volume. After immersion for approximately 5 minutes under ultrasonic vibration and 30 minutes without vibration, the pellets were removed from the solution and dried in air for 3 hours at 230° F. (110° C.), followed by heating in a hydrogen atmosphere to form the metal crystallites on the substrate material. This procedure deposits a surface layer of catalyst about 0.050 in. (0.127 cm) on the particulate material. If full impregnation is desired, immersion time in the Rh $(NO_3)_3$ should be extended, e.g. doubled.

The hydrogen reduction step was performed as follows: the above-treated pellets were placed on a tray in an oven which was first flushed with nitrogen. The oven temperature was raised to approximately 600° F. (316° C.) and the atmosphere over the pellets changed according to the following schedule:

| % $N_2$ | % $H_2$ | Time in Hours |
|---|---|---|
| 100 | 0 | 0.25 |
| 95 | 5 | 0.25 |
| 90 | 10 | 0.25 |
| 75 | 25 | 0.50 |
| 0 | 100 | 2.00 |

After cooling to 200° F. (93° C.), the atmosphere over the pellets is changed to 100% $N_2$. The pellets are then cooled to room temperature and the atmosphere over the pellets adjusted as follows:

| % $N_2$ | % $O_2$ | Time in Hours |
|---|---|---|
| 95 | 5 | 0.5 |
| 90 | 10 | 0.5 |
| 80 | 20 | 0.5 |

To further demonstrate the improved performance of the combustion catalyst according to the present invention, the following testing was performed. Utilizing a microreactor 0.375 in. (0.953 cm) inner diameter containing 1 inch (2.54 cm) length or approximately 0.5 gram of catalyst material, reaction rate constants (synonymous with activity) were plotted as a function of test temperature. Testing was performed for 30 hours combusting a mixture of methane containing approximately 2200 parts per million (by weight) $H_2S$. The reaction rate constant (k) is defined by the pseudo first order rate equation:

$$k = (\text{space velocity}) \times \ln\left(\frac{1}{1 - \frac{\% \text{ conversion}}{100}}\right)$$

In FIG. 3, data for commercially available catalysts (15% nickel by weight on alpha alumina—curve A) and a catalyst according to the Example (curve B) are plotted on a conventional Arrhenius graph. As can be seen from the curves, the catalyst of curve B provides much greater activity at lower temperature.

To prepare a catalytic combustor according to the present invention, it is preferred to utilize a canister type container having a stainless steel support screen utilizing wire with a 0.032 in. (0.081 cm) diameter and 256 holes per inch$^2$ or 40 holes per cm$^2$ (i.e. 45% open). The walls of the canister are typically 300 series stainless steel such as 304 stainless steel. One or two layers of uncatalyzed 0.25 inch (0.635 cm) diameter pellets are dropped onto the support screen. Following this, one or two layers of the fully catalyzed pellets of the same size are deposited. One or two layers of ring catalyzed pellets of the same size are poured on top of the fully catalyzed pellets followed by pouring one or two layers of uncatalyzed pellets, again of the same size, as an exit radiation shield as the final layer. The canister can then be covered with a temporary plastic cover to prevent excess movement during shipping. Note FIG. 4 where the canister is shown as 6 and support screen 1 and particle layers 2, 3, 4 and 5 are as defined in FIGS. 1 and 2.

The thickness of the bed should be kept to a minimum to minimize the pressure drop across the bed, especially for a natural draft device such as a coal or wood burning stove. Industrial burners which utilize blowers for primary air can afford a deeper bed of catalyst and the accompanying higher pressure drop. If the pressure drop in either the natural draft or blower assisted environment is too great, i.e. the flow is restricted, the combustion rate of the wood or other solid fuel is adversely affected. However, there should be sufficient catalyst to provide a gas residence time which permits the catalyst to affect combustion of the gases on the catalyst. Since the draft on typical residential chimneys is in the order of 0.05 in. to 0.10 in. (0.127 cm to 0.254 cm) water as can be determined from the *Standard Handbook for Mechanical Engineers*, 7th Edition, McGraw Hill Book Co., the catalyst bed in the natural gas environment is sized in frontal area and bed depth to have a pressure drop in the order of 0.01 in. (0.0254 cm) water to minimize flow restriction. The pressure drop can be measured with a sensitive delta pressure guage. Another way of detecting if the pressure drop is low enough and is not restricting is by determining if the fuel combustion rate, in pounds fuel burned per hour, is satisfactory. If the pressure drop is too low, i.e. the bed is too thin, bypassing and incomplete combustion of the smoke can occur. This can be detected by observing smoke in the stove's exhaust.

It should also be noted that while the invention has been described in terms of a rhodium catalyst, other catalysts such as ruthenium, nickel, palladium, iron oxide, or conventional combustion catalysts are useful. Further, if it is desired, the exit layer of uncatalyzed particles can be eliminated and other heat retaining means to limit radiation losses from the bed can be designed into the system, such as a radiation shielding, plate of ceramic or other high temperature stable material.

Although the invention has been shown and described with respect to detailed embodiments thereof, it will be understood by those skilled in the art that various changes in form and detail thereof may be made without departing from the spirit and scope of the claimed invention.

We claim:

1. In a catalytic combustor comprising combustion catalyst material so selected and constituted so as to combust uncombusted gases from a previous combustion reaction, wherein the improvement comprises utilizing such catalysts in a bed configuration comprising a support screen, a layer of substantially fully catalyst impregnated particulate material next to the support screen, a layer of surface catalyst impregnated particulate material next to the fully impregnated material, and a layer of uncatalyzed particulate material next to the layer of surface impregnated material, the thickness of the layers and particulate size so constituted as to substantially fully combust the uncombusted gases passing therethrough with a minimal pressure drop across the bed.

2. The combustor of claim 1 additionally containing a layer of uncatalyzed particulate material between the support screen and layer of fully impregnated particulate material.

3. The combustor of claims 1 or 2 wherein the catalyst is rhodium and the particulate material is lanthanum stabilized alumina or magnesium promoted lanthanum stabilized alumina.

4. The combustor of claim 1 wherein all of the particulate material is substantially the same size excluding the fully impregnated particulate material which is about 0.25 to about 0.5 times the volumetric size of such particulate material.

5. A solid fuel burning stove comprising an air inlet section, a combustion section, a combusted and uncombusted gas exhaust section and a catalytic combustor in the exhaust section wherein the improvement comprises utilizing a catalytic combustor comprising a support screen, a layer of substantially fully catalyst impregnated particulate material next to the support screen, a layer of surface catalyst impregnated particulate material next to the fully impregnated material, and a layer of uncatalyzed particulate material next to the layer of surface impregnated material, the thickness of the layers and particulate size so constituted as to substantially fully combust the uncombusted gases passing therethrough with a minimal pressure drop across the bed.

6. The stove of claim 5 wherein the combustor additionally contains a layer of uncatalyzed particulate material between the support screen and a layer of fully impregnated particulate material.

7. The stove of claims 5 or 6 wherein the catalyst is rhodium and the particulate material is lanthanum stabilized alumina or magnesium promoted lanthanum stabilized alumina.

8. The stove of claim 5 wherein all of the particulate material in the combustor is substantially the same size excluding the fully impregnated particulate material which is about 0.25 to about 0.5 times the volumetric size of such particulate material.

* * * * *